(12) United States Patent
Oh (10) Patent No.: US 8,102,578 B2
(45) Date of Patent: Jan. 24, 2012

(54) IMAGE SCANNING APPARATUS AND METHOD OF SCANNING BOTH SIDES OF A PRINTED MEDIUM USING THE SAME

(75) Inventor: Jin-kyu Oh, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1045 days.

(21) Appl. No.: 11/937,614

(22) Filed: Nov. 9, 2007

(65) Prior Publication Data

US 2008/0231920 A1    Sep. 25, 2008

(30) Foreign Application Priority Data

Mar. 19, 2007    (KR) .................. 10-2007-0026793

(51) Int. Cl.
  *H04N 1/04*    (2006.01)
(52) U.S. Cl. ........ 358/498; 358/496; 399/364; 399/374; 399/369; 399/376
(58) Field of Classification Search .................. 358/498, 358/496; 399/364, 374, 369, 376; 271/186; 355/23, 24
See application file for complete search history.

(56) References Cited

U.S. PATENT DOCUMENTS

| | | | |
|---|---|---|---|
| 5,461,468 A | | 10/1995 | Dempsey et al. |
| 5,991,592 A | * | 11/1999 | Kobayashi et al. ........... 399/374 |
| 6,101,283 A | | 8/2000 | Knox |
| 6,161,831 A | * | 12/2000 | Kusakabe et al. ............. 271/186 |
| 6,285,852 B1 | * | 9/2001 | Etoh et al. ..................... 399/367 |
| 6,354,589 B1 | * | 3/2002 | Taruki et al. ............. 271/265.01 |
| 6,648,320 B2 | * | 11/2003 | Iino et al. ..................... 271/3.15 |
| 7,330,691 B2 | * | 2/2008 | Yoo ................................ 399/367 |
| 7,394,580 B2 | * | 7/2008 | Ohsawa ........................ 358/498 |
| 7,431,282 B2 | * | 10/2008 | Ohama .......................... 271/65 |
| 7,512,375 B2 | * | 3/2009 | Horio ............................ 399/374 |
| 7,623,277 B2 | * | 11/2009 | Wang et al. ................... 358/498 |
| 7,784,680 B1 | * | 8/2010 | Mason et al. ................. 235/379 |

(Continued)

FOREIGN PATENT DOCUMENTS

EP    0 654 933    5/1995

(Continued)

OTHER PUBLICATIONS

Search Report issued in European Patent Application No. 08100299.0 on Nov. 28, 2008.

(Continued)

*Primary Examiner* — Cheukfan Lee
(74) *Attorney, Agent, or Firm* — Staas & Halsey LLP (57) ABSTRACT

An image scanning apparatus includes a reversal tray on which printable media are temporarily stacked, and a reverse roller installed inside a main body immediately before the reversal tray at a junction between the reversal tray and an end of a second moving path, which is driven in both clockwise and anti-clockwise directions by power transmitted via a discharge roller to guide one of the printable media towards and away from the reversal tray along a second moving path, wherein a feeder, a pick-up roller, a scanning unit, a discharge tray, and transport rollers are installed on a first moving path in order to scan images from one side of the printable medium, and the reversal tray and the reverse roller are installed on the second moving path in order to scan images from the other side of the printable medium.

14 Claims, 8 Drawing Sheets

U.S. PATENT DOCUMENTS

| | | |
|---|---|---|
| 2006/0170989 A1 | 8/2006 | Kim |
| 2006/0171751 A1* | 8/2006 | Won ............................. 399/365 |
| 2007/0003344 A1* | 1/2007 | Lee et al. ...................... 399/374 |
| 2007/0183004 A1* | 8/2007 | Jo ................................. 358/498 |
| 2008/0159793 A1* | 7/2008 | Park ............................. 399/374 |
| 2008/0193181 A1* | 8/2008 | Jeong et al. .................. 399/401 |
| 2009/0168093 A1* | 7/2009 | Kim ............................. 358/1.15 |
| 2010/0097668 A1* | 4/2010 | Chung ......................... 358/498 |
| 2010/0110502 A1* | 5/2010 | Chung ......................... 358/474 |

FOREIGN PATENT DOCUMENTS

| | | |
|---|---|---|
| JP | 03-215871 | 9/1991 |
| JP | 08-208130 | 8/1996 |
| JP | 2002-080147 | 3/2002 |
| KR | 10-2006-0087778 | 8/2006 |

OTHER PUBLICATIONS

Korean Office Action dated Jun. 28, 2011, issued in corresponding Korean Patent Application No. 10-2007-0026793.

Korean Notice of Allowance mailed Nov. 29, 2011 in Korean Patent Application No. 10-2007-0026793.

* cited by examiner

IMAGE SCANNING APPARATUS AND METHOD OF SCANNING BOTH SIDES OF A PRINTED MEDIUM USING THE SAME

CROSS-REFERENCE TO RELATED APPLICATION

This application claims all benefits accruing under 35 U.S.C. §119 from Korean Patent Application No. 2007-26793, filed on Mar. 19, 2007, in the Korean Intellectual Property Office, the disclosure of which is incorporated herein by reference.

BACKGROUND OF THE INVENTION

1. Field of the Invention

Aspects of the present invention relate to an image scanning apparatus and a method of scanning both sides of a printable medium using the image scanning apparatus, and more particularly, to an image scanning apparatus having an additional printable medium reversal tray that temporarily supports a printable medium to scan both sides of the printable medium, and a method of scanning both sides of the printable medium using the image scanning apparatus.

2. Description of the Related Art

Figure 1:
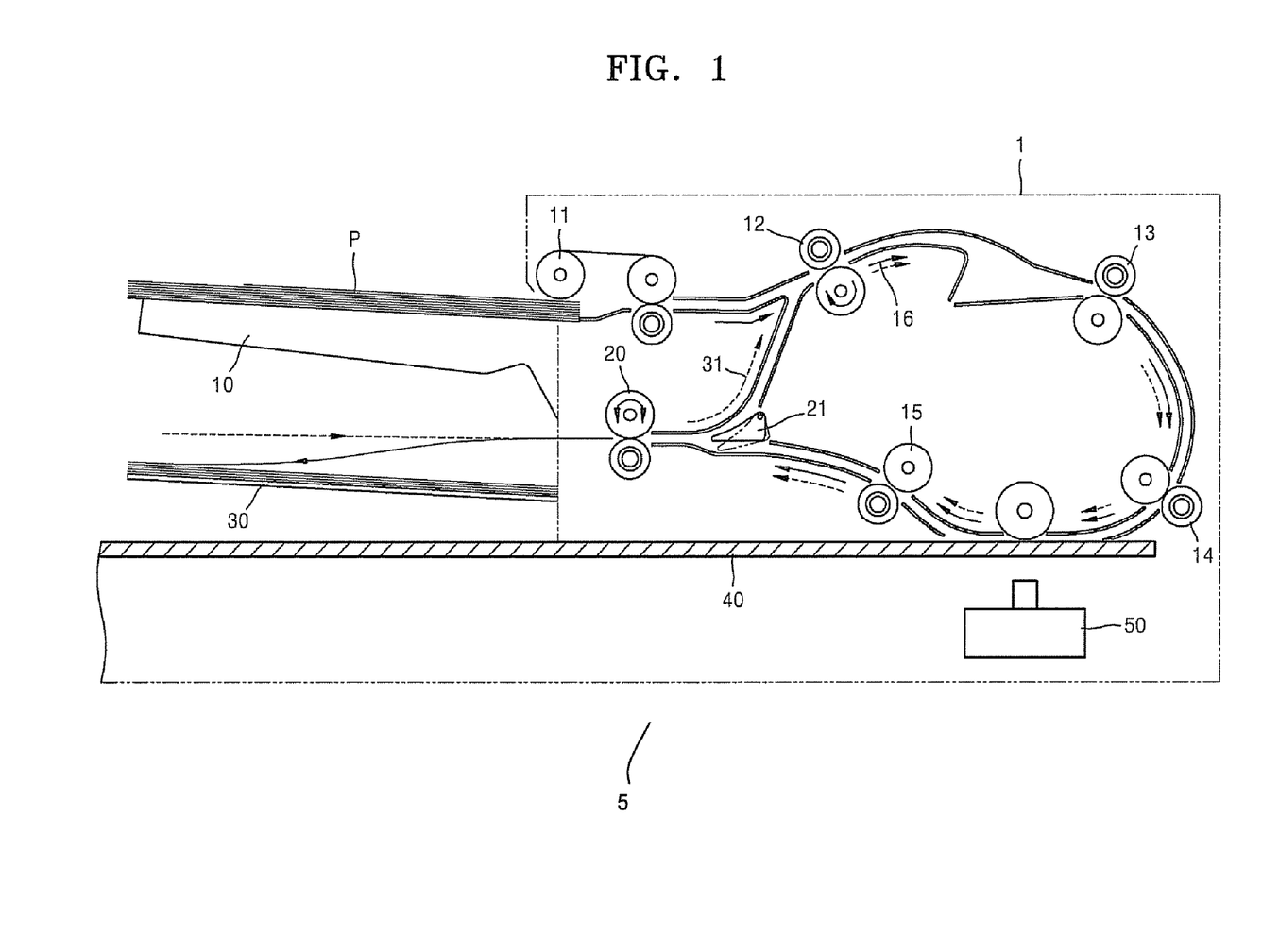
FIG. 1 is a lateral cross-sectional view of a conventional image scanning apparatus.

Image scanning apparatuses scan an image which is formed on a printable medium, such as paper, a transparency sheet, etc. FIG. 1 is a lateral cross-sectional view of a conventional image scanning apparatus. While shown individually, the image scanning apparatus shown in FIG. 1 may be combined with other devices, such as printers, copiers, and facsimile machines to provide a multi-function apparatus.

Referring to FIG. 1, the conventional image scanning apparatus includes a feeder 10 where printable media P that are to be scanned are stacked and a discharge tray 30 where the printable media P are scanned are stacked. The feeder 10 and the discharge tray 30 are mounted on a main body 1.

The main body 1 includes a pick-up roller 11, a plurality of transport rollers 12, 13, 14, and 15, a pair of discharge rollers 20, and a scanning unit 50. The pick-up roller 11 picks up the printable media P sheet by sheet and transports the individual sheets of printable media P into the main body 1. The transport rollers 12, 13, 14, and 15 each includes a pair of rollers to transport the printable medium P that was picked up by the pick-up roller 11 through the main body 1 during a scanning operation. The pair of discharge rollers 20 discharges the printable medium P to the discharge tray 30 after the scanning operation. The scanning unit 50 scans images on the printable medium P. A platen glass 40, also known as a flatbed, supports the printable medium P when the printable medium P is scanned above the scanning unit 50.

A conventional method of scanning one side of a printable medium P and the other side of the printable medium P using the conventional image scanning apparatus having the above structure will now be described.

The operation of scanning the sides of the printable medium P begins when the printable medium P is picked up by the pick-up roller 11. Then, the printable medium P is transported through a moving path 16, as indicated by the solid arrows in FIG. 1, by the transport rollers 12, 13, and 14, and an image of the printable medium P is scanned while the printable medium P passes by the scanning unit 50. The scanned printable medium P is discharged to the discharge tray 30 by the pair of discharge rollers 20 after the printable medium P has passed through the transport rollers 15.

Then, in order to scan the other side of the printable medium P after the first side of the printable medium P has been scanned as described above, the rotation of the pair of discharge rollers 20 is stopped before the printable medium P completely passes the pair of discharge rollers 20. Afterwards, the printable medium P, a side of which has been scanned, is reversely transported in an opposite direction to the direction in which the printable medium P has been moving by reversely rotating the pair of discharge rollers 20 in a counterclockwise direction in FIG. 1. At this point, a path converting unit 21 guides the printable medium P that has been reversely transported to enter a duplex path 31 as indicated by the dotted arrows in FIG. 1.

The printable medium P enters the duplex path 31 and is transported by the transport rollers 12, 13, and 14 so that the other side of the printable medium P is scanned as the printable medium P passes by the scanning unit 50. Then, the printable medium P, both sides of which have been scanned, is discharged to the discharge tray 30 by the pair of discharge rollers 20 after passing through the transport rollers 15.

When a plurality of the printable media P are discharged to the discharge tray 30 after both sides of each of the printable media P have been scanned, the printable media P are stacked in a reverse order compared to the original order that the printable media P were stacked in while located the feeder 10. Thus, in order to stack the printable media P on the discharge tray 30 in the same original order as the printable media P were originally stacked on the feeder 10, the printable media P, both sides of which have been scanned, must be transported once more through the moving path 16 as indicated by the solid arrows.

In the conventional image scanning apparatus having the above-described structure, in order to scan both sides of the printable media P, the printable media P which have been discharged to the discharge tray 30 are re-fed by the pair of discharge rollers 20 that reversely rotate. At this point, due to a large inclination between the moving path and the duplex path 31, the printable media P may impact the duplex path 31 with excessive force. In particular, if the printable media P are thick, the printable media P may get damaged.

Also, when a large number of printable media P are discharged and stacked on the discharge tray 30, during the operation of scanning both sides of subsequent printable media P, the subsequent printable media P may get jammed in the body 1 of the conventional image scanning apparatus due to blockage by the stacked printable media P. Alternatively, the subsequent printable media may push the printable media P stacked on the discharge tray 30 off the discharge tray 30 due to interference between the subsequent printable media P being scanned and the printable media P stacked on the discharge tray 30.

SUMMARY OF THE INVENTION

To solve the above and/or other problems, aspects of the present invention provide an image scanning apparatus that can prevent interference between discharged printable media and printable media in the process of being scanned on both sides by providing an additional reversal tray, and a method of scanning both sides of the printable media using the image scanning apparatus.

Additional aspects and/or advantages of the invention will be set forth in part in the description which follows and, in part, will be obvious from the description, or may be learned by practice of the invention.

According to an example embodiment of the present invention, an image scanning apparatus includes a feeder on which printable media are stacked; a pick-up roller to pick up each printable medium from the feeder to guide the printable medium along a first moving path; a scanning unit to scan images on the printable medium; discharge rollers to discharge the printable medium after the printable medium has been scanned via a discharge tray; transportation rollers to transport the printable media between the pick-up roller and the scanning unit; a reversal tray located between the discharge tray and the feeder, on which the printable medium is temporarily stacked; and a reverse roller installed before the reversal tray at a junction between the reversal tray and an end of a second moving path, which is rotatable in both clockwise and anti-clockwise directions by power transmitted via one of the discharge rollers in order to guide the printable medium towards and away from the reversal tray along the second moving path, wherein the feeder, the pick-up roller, the scanning unit, the discharge tray, and the transport rollers are installed along the first moving path in order to scan images on one side of the printable medium, and the reversal tray and the reverse roller are installed along the second moving path in order to scan images from the other side of the printable medium.

According to an aspect of the present invention, if the printable medium is to be stacked on the discharge tray in the original stacking order, the reverse roller selectively contacts an upper one of the discharge rollers according to a length of the printable medium in relation to a length of a loop.

According to an aspect of the present invention, if the length of the printable medium is longer than the length of the loop, the reverse roller is controlled to contact the upper one of the discharge rollers and reversely transfer the printable medium from the reversal tray to the second moving path until a first sensor detects a front end portion of the printable medium, is then controlled to be separated from the upper one of the discharge rollers until a second sensor senses a rear end portion of the printable medium, and is then controlled to re-contact the upper one of the discharge rollers to transfer the printable medium to the reversal tray, and if otherwise, the reverse roller is controlled to constantly contact the upper one of the discharge rollers.

According to another example embodiment of the present invention, a method of scanning both sides of the printable medium using an image scanning apparatus includes stacking the printable medium on the reversal tray after the one side has been scanned; reversing a movement of the printable medium stacked on the reversal tray using the reverse roller; and scanning the other side of the printable medium.

According to another aspect of the present invention, the method includes transporting the printable medium between a pick-up roller and a scanning unit along a first moving path using transport rollers, sensing a front end portion of the printable medium passing the transport rollers, and sensing a rear end portion of the printable medium moving along a second moving path.

According to another aspect of the present invention, if a stacking order of the printable medium on a discharge tray is to be an original stacking order and a length of the printable medium is longer than a length of a loop from the reverse roller back to the reverse roller along the first moving path and the second moving path, the method further includes controlling the reverse roller to contact an upper one of discharge rollers to reversely transfer the printable medium from the reversal tray to the second moving path until the sensing of the front end portion, controlling the reverse roller to be separated from the upper one of the discharge rollers until the sensing of the rear end portion of the printable medium, and controlling the reverse roller to re-contact the upper one of the discharge rollers to transfer the printable medium to the reversal tray.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
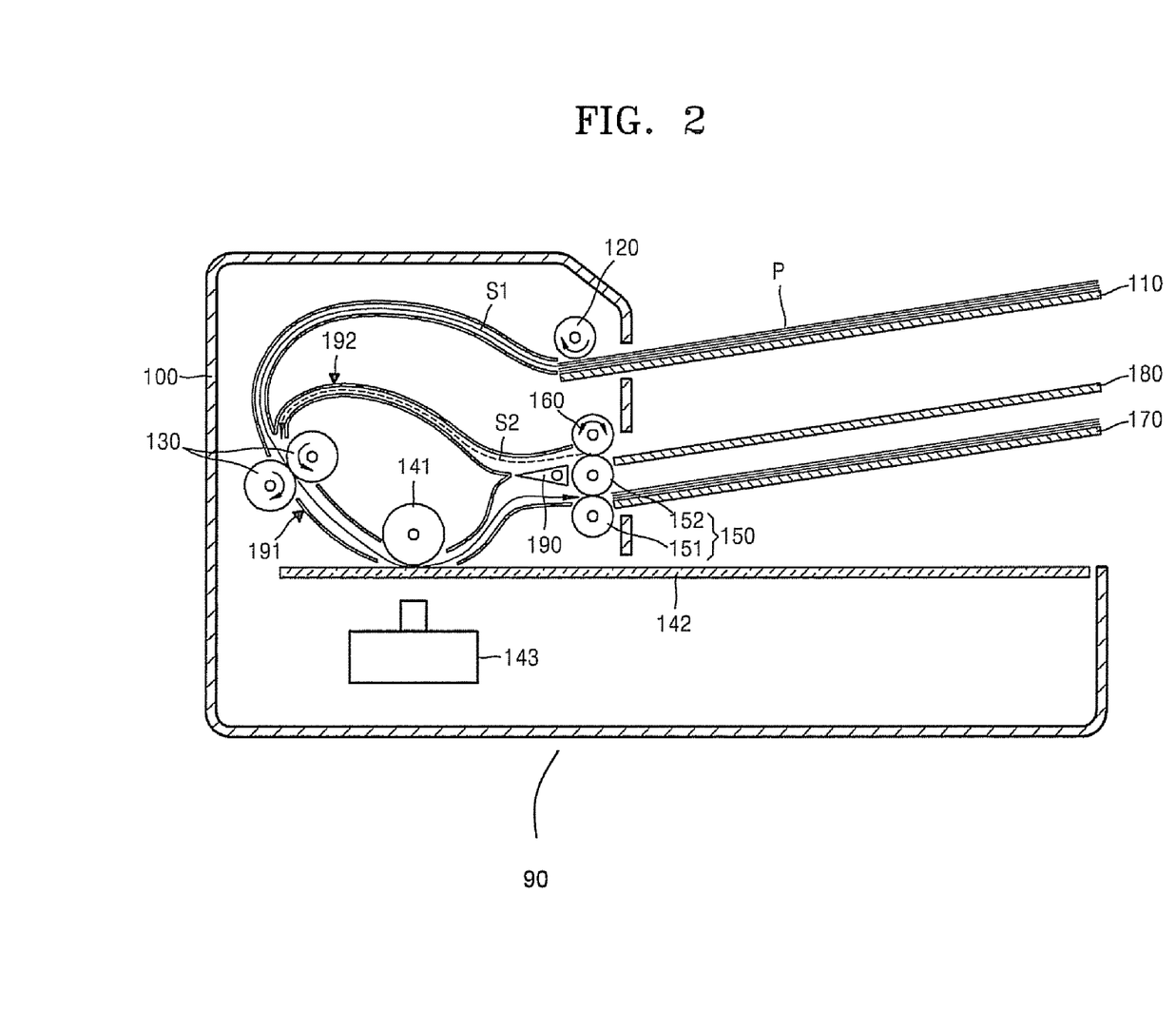
FIG. 2 is a lateral cross-sectional view of an image scanning apparatus according to an example embodiment of the present invention.
Figure 3:
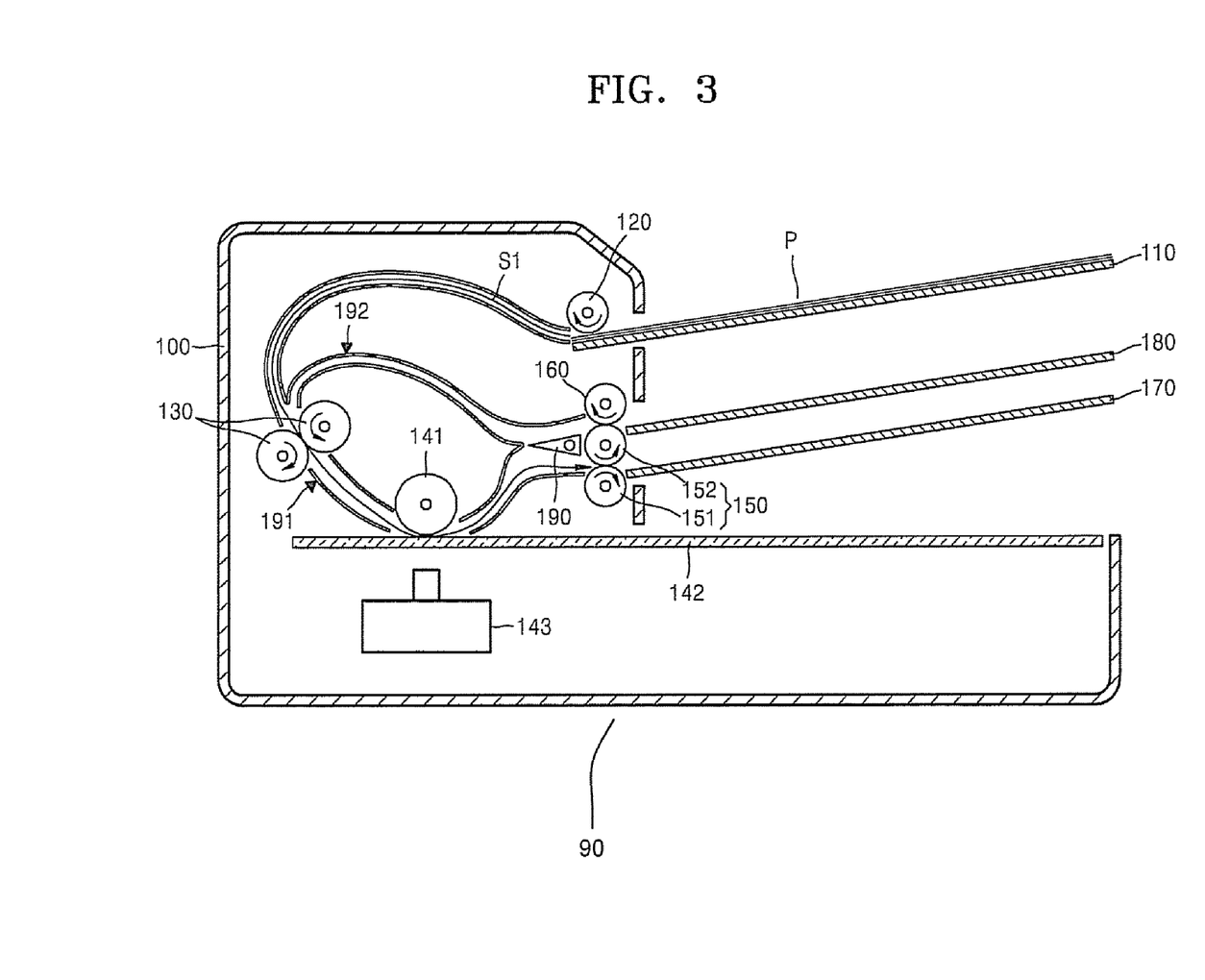
FIG. 3 is a lateral cross-sectional view illustrating an operation of scanning a side of a printable medium using the image scanning apparatus illustrated in FIG. 2, according to an embodiment of the present invention.
Figure 4A:
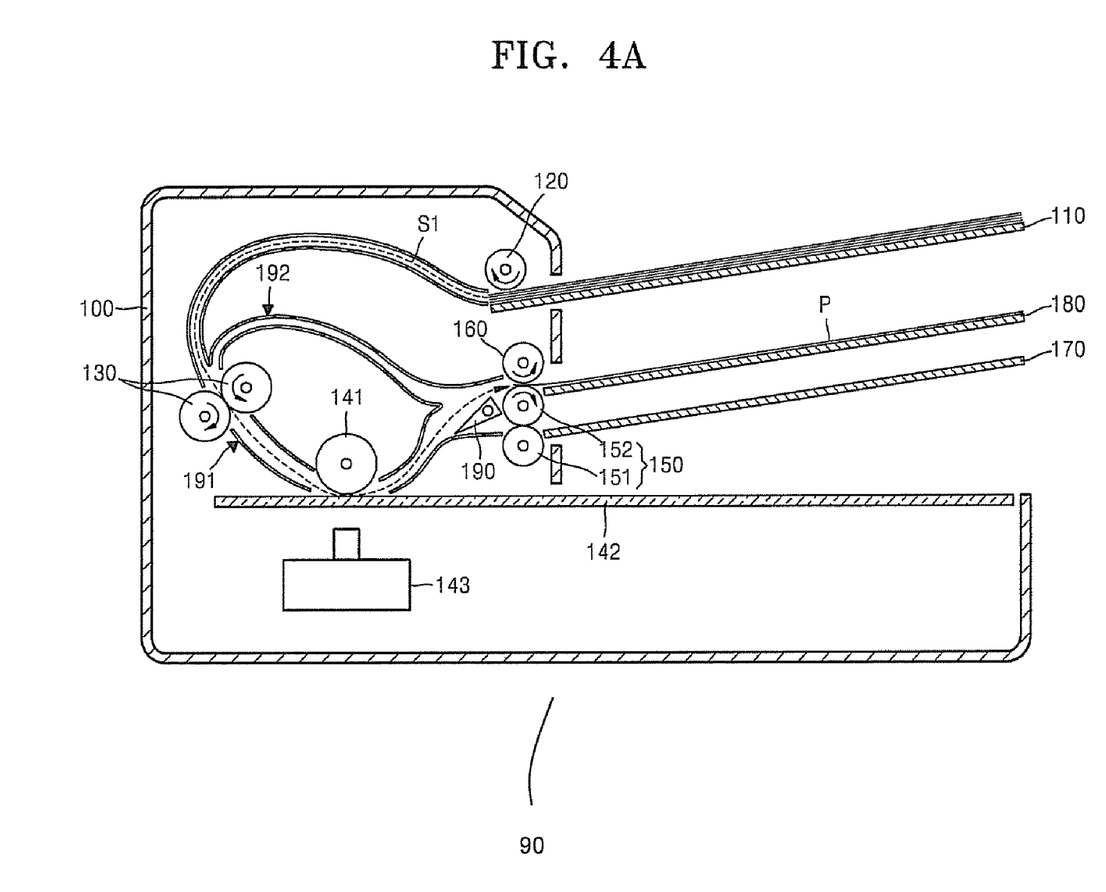
FIGS. 4A and 4B are lateral cross-sectional views illustrating an operation of scanning both sides of a printable medium using the image scanning apparatus illustrated in FIG. 2, according to an embodiment of the present invention.
Figure 4B:
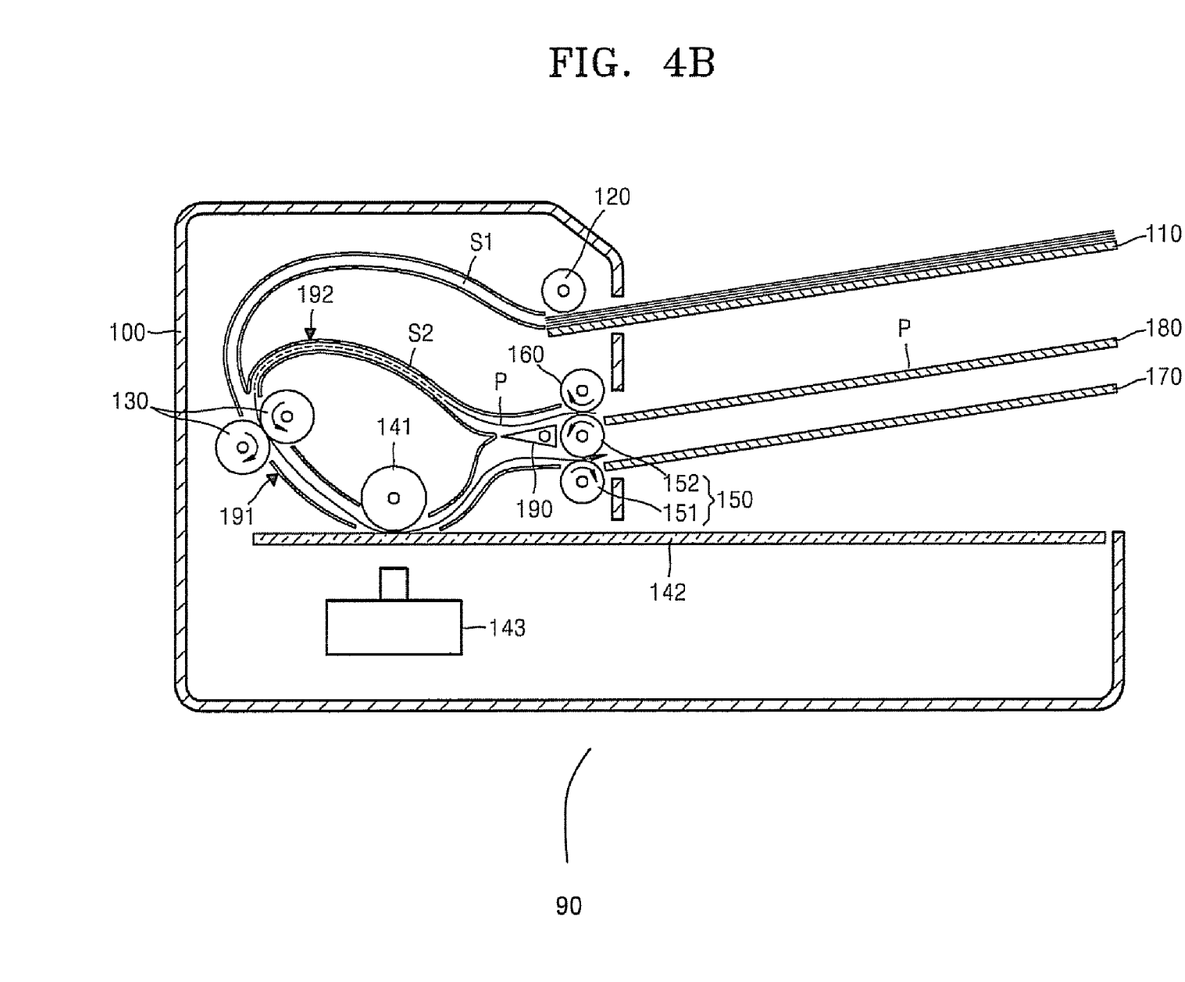
Figure 5A:
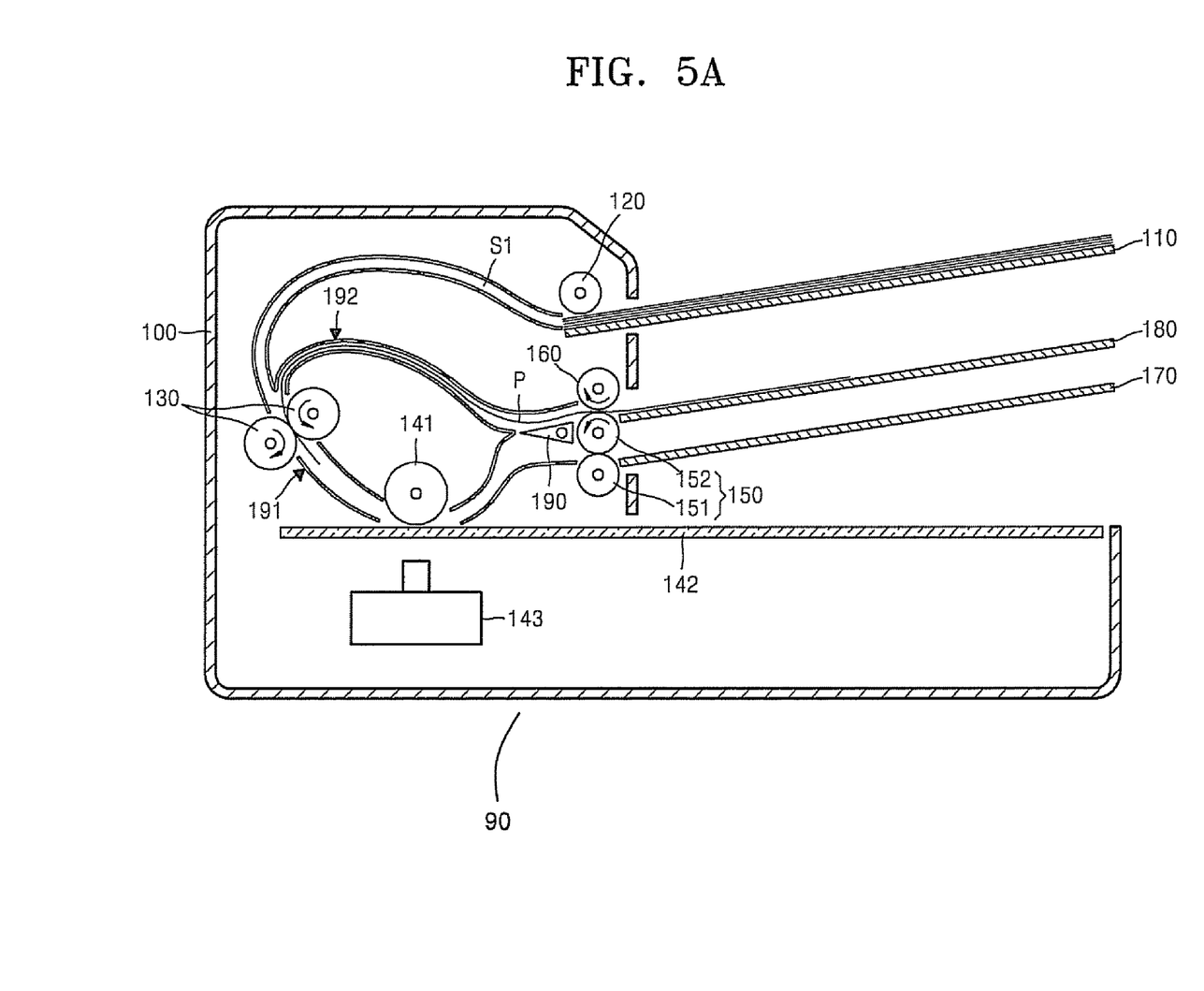
FIGS. 5A through 5C are lateral cross-sectional views illustrating an operation of arranging printable media moving in a forward direction in the image scanning apparatus illustrated in FIG. 2, according to an embodiment of the present invention.
Figure 5B:
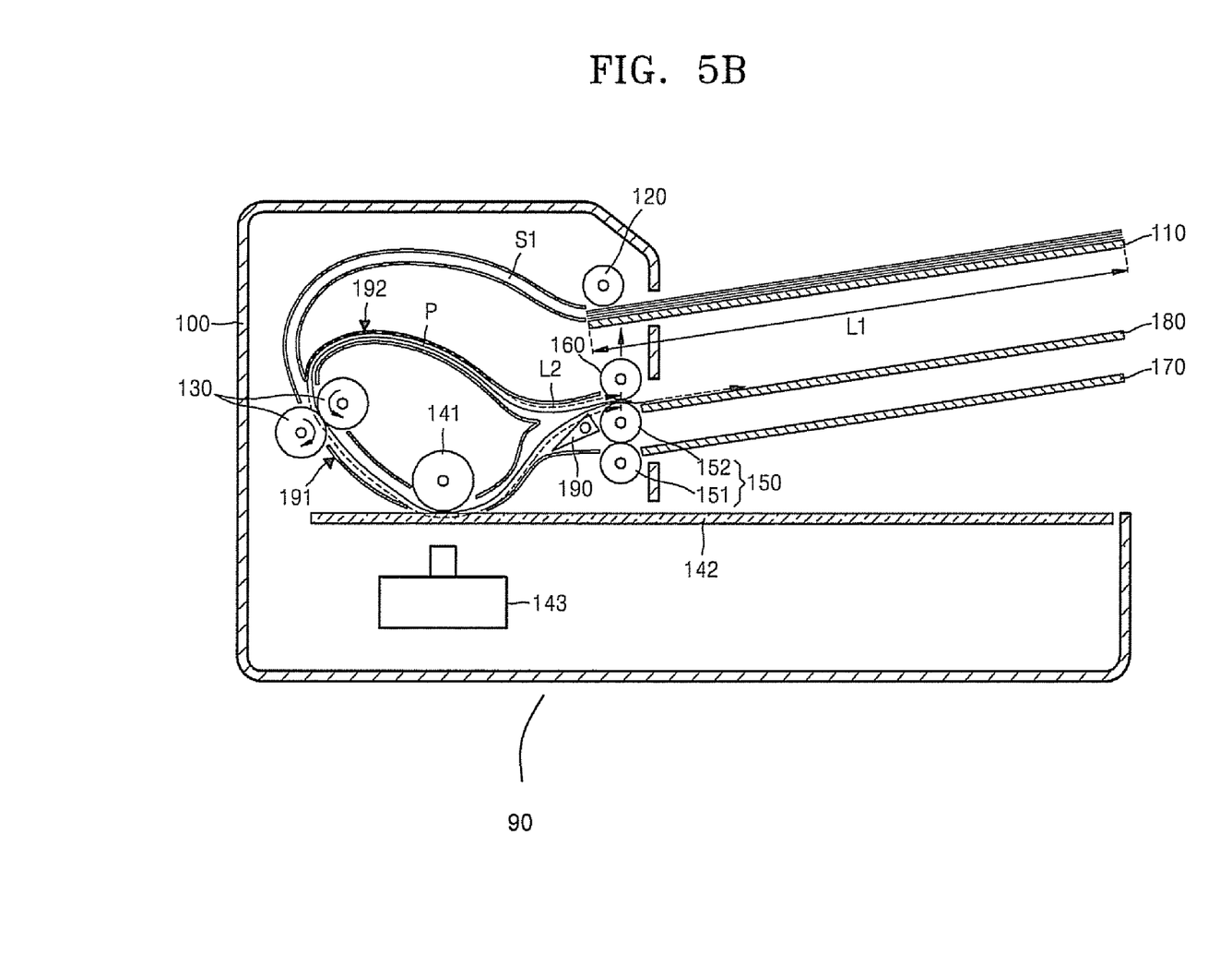
Figure 5C:
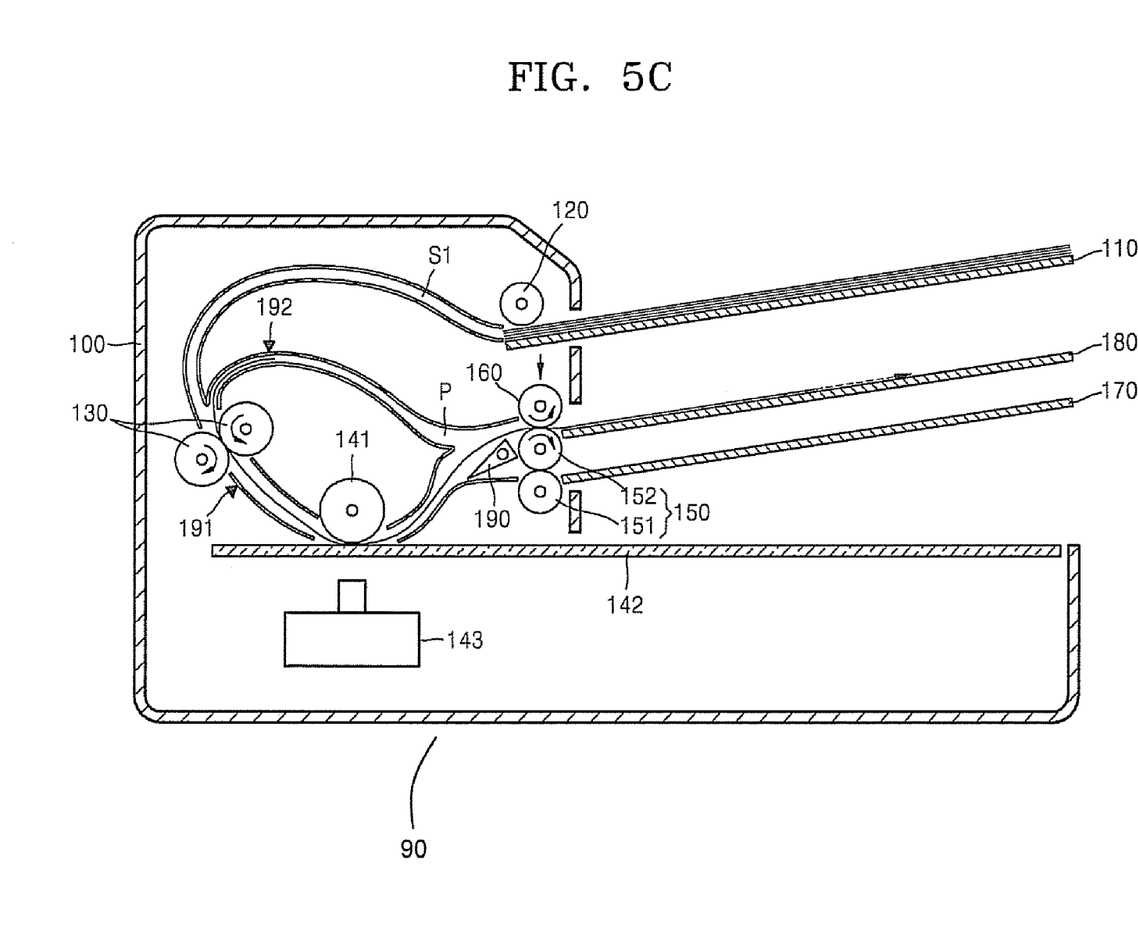

FIG. 2 is a lateral cross-sectional view of an image scanning apparatus according to an example embodiment of the present invention. FIG. 3 is a lateral cross-sectional view illustrating an operation of scanning a side of a printable medium using the image scanning apparatus illustrated in FIG. 2. FIGS. 4A and 4B are lateral cross-sectional views illustrating an operation of scanning both sides of a printable medium using the image scanning apparatus illustrated in FIG. 2, according to example embodiments of the present invention. FIGS. 5A, 5B and 5C are lateral cross-sectional views illustrating an operation of arranging printable media in a forward direction in the image scanning apparatus of FIG. 1, according to an example embodiment of the present invention.

Referring to FIG. 2, an image scanning apparatus according to an embodiment of the present invention includes a feeder 110, a reversal tray 180, and a discharge tray 170 which is attachably detachable to a main body 100. Although illustrated as an image scanning apparatus, it is understood that aspects of the present invention are not limited to being applied to an image scanning apparatus, and may instead be applied to a multi-function apparatus which includes, for example, an image scanning apparatus and an image forming apparatus such as a printer, copier, facsimile, etc.

The main body 100 includes a first moving path S1 (indicated by a solid line) which is a path to transport printable media P to scan one side of each of the printable media P and a second moving path S2 (indicated by a dotted line) which is a path to reverse the direction of the printable media P and transport the printable media P in an opposite direction to scan the other side of each of the printable media P. The second moving path S2 and the first moving path S1 are located along the same path from the feeder 110 to immediately before a pair of transport rollers 130. It is understood that more than one pair of the transport rollers 130 may be installed along this common path area. It is further understood that the printable media P may be a wide variety of printing media, such as paper, recycled paper, transparency sheets, letterhead, stationary, etc.

A pick-up roller 120 individually picks up the printable media P sheet by sheet. The pick-up roller 120 is installed above the feeder 110 immediately within the main body 100. On the first moving path S1, a scanning unit 143 scans images formed on the printable media P and a supporting roller 141 presses the printable media P towards the scanning unit 143. The scanning unit 143 and the supporting roller 141 are formed opposite each other on both sides of a platen glass 142, also known as a flatbed. The platen glass 142 is formed of a transparent material, such as glass, plastic, etc. Thus, light emitted from the scanning unit 143 is irradiated onto the printable media P when the printable media P pass between the supporting roller and the platen glass 142.

A pair of discharge rollers 150 discharges the printable media P to the discharge tray 170. The pair of discharge rollers 150 is installed on the inside of the main body 100 at the end of the first moving path S1. The pair of discharge rollers 150 includes two rollers 151 and 152 which are mounted to contact each other so that both of the rollers 151 and 152 rotate together. One of the two rollers 151 and 152 is a driving roller which is connected to and driven by a motor (not shown) and the other one of the two rollers 151 and 152 is a driven roller driven by frictional contact with the one driving roller.

The reversal tray 180 is installed outside of the main body 100 at an end of the second moving path S2, as illustrated in FIG. 2. The printable media P are stacked on the reversal tray 180 after one side of each of the printable media P has been scanned by the scanning unit 143. A reverse roller 160 rotates by contacting one of the two rollers 151 and 152 of the pair of discharge rollers 150 and is installed immediately before the reversal tray 180 at the junction between the reversal tray 180 and the end of the second moving path S2. According to an aspect of the present invention, the reverse roller 160 is attached to the main body 100 so as to be capable of rotating in both clockwise and counter-clockwise directions, as represented by the arrows on the reverse roller 160 shown in FIG. 2. Accordingly, the two rollers 151 and 152 which constitute the pair of discharge rollers 150 are also attached to the main body 100 so as to be capable of rotating in both clockwise and counter-clockwise directions.

According to another aspect of the present invention, the reverse roller 160 may be installed to be able to separate from the roller 152. Hence, the reverse roller 160 may be installed to be able to separate from and contact with the roller 152 by being moved by a driving means (not shown) controlled by a user, enabling a user to choose when to use the reverse roller 160.

A path conversion unit 190 selectively guides the printable media P along the first moving path S1 towards the pair of discharge rollers 150 or along the second moving path S2 towards the reverse roller 160. According to an aspect of the present invention, the path conversion unit 190 is disposed in front of the pair of discharge rollers 150 as shown in FIG. 2. However, aspects of the present invention are not limited to the configuration shown in FIG. 2. For example, a plurality of path conversion units 190 may be respectively disposed in front of the pair of discharge rollers 150.

A first sensor 191 detects the printable media P that are moving along the first moving path S1. According to an aspect of the present invention, the first sensor 191 is located between the transport rollers 130 and the scanning unit 143. A second sensor 192 detects the printable media P that are moving along the second moving path S2. According to an aspect of the present invention, the second sensor 192 is located on the second moving path S2. However, the locations of the first and second sensors 191 and 192 are not limited to the positions shown in FIG. 2. For example, first sensor 191 can be positioned at any point between the transport rollers 130 and the scanning unit 143, and the second sensor 192 can be positioned at any point on the second moving path S2.

A method of scanning a side of a printable medium P and a method of scanning both sides of the printable medium P using the image scanning apparatus having the above-described configuration will now be described with reference to FIGS. 3, 4A, and 4B.

A method of scanning one side of the printable medium P will now be described with reference to FIG. 3. First, the printable medium P is moved along the first moving path S1 to be scanned by the scanning unit 143, as indicated by the solid line shown in FIG. 3. To move the printable medium P along the first moving path S1, the pick-up roller 120 picks up the printable medium P from the printable medium feeder 110, the transport rollers 130 transport the printable medium P along the first moving path S1, and the scanning unit 143 scans the printable medium P while the printable medium P passes over the scanning unit 143 along the platen glass 142. The scanned printable medium P is then stacked on the discharge tray 170 by the pair of discharge rollers 150.

Next, a method of scanning both sides of the printable medium P will be described with reference to FIGS. 4A and 4B. Referring to FIG. 4A, after the printable medium P has been scanned on one side thereof by travelling along the first moving path S1, the printable medium P is discharged towards the reversal tray 180 by the path conversion unit 190, which guides the printable medium P towards the reverse roller 160. At this point, a trailing end of the printable medium P remains between the reverse roller 160 and the discharge roller 152 at a nip formed between the reverse roller 160 and the discharge roller 152. In order to reverse the path of printable medium P towards the second moving path S2, the end of the printable medium P should remain between stuck between the nip formed between the reverse roller 160 and the discharge roller 152. It is understood that the reverse roller 160 may be controlled to keep various sizes of the printable medium P in the nip formed between the reverse roller 160 and the discharge roller 152, for example, 1 cm of the printable medium P, 5 cm of the printable medium P, etc.

Referring to FIG. 4B, the printable medium P in the reversal tray 180, a side of which has been scanned, is transported along the second moving path S2 by rotating the reverse roller 160 in a clockwise direction in FIG. 4B and by controlling the path conversion unit 190 to rotate so that the downward path to the first moving path S1 is blocked. The printable medium P moves along the second moving path S2 and is then is transported back into the first moving path S1 by the transport rollers 130, and an image formed on the other side of the printable medium P is scanned while the printable medium P passes by the scanning unit 143. Afterwards, the printable medium P is discharged to the discharge tray 170 by the pair of discharge rollers 150.

When both sides of the printable medium P are scanned, the stacking order of a plurality of the scanned printable media P stacked on the discharge tray 170 are in an inverse order of the order in which the same printable media P are stacked on the feeder 110. Therefore, in order to reverse the inverted order of the printable media P stacked on the discharge tray 170, the printable media P are re-transported along the second moving path S2 along the loop formed by the first moving path S1 and the second moving path S2. Thus, sides of the printable media P stacked on the feeder 110 which originally faced up on the feeder 110 are arranged to face downwards on the discharge tray 170.

As shown in FIG. 5A, when the length L1 of the printable medium P in a lengthwise direction is equal to or greater than a transportation length L2 (as indicated by the dotted arrow in FIG. 5B), i.e., a loop, which is a distance from the reverse roller 160 to the discharge roller 152 via the second moving path S2, the printable medium P can overlap between the reverse roller 160 and the discharge roller 152, thereby interrupting a smooth transportation of the printable medium P. In other words, if the printable medium P has a length L1 which is sufficiently long so that the front end portion and the rear end portion of the printable medium P are simultaneously passing between the reverse roller 160 and the discharge roller 152, there is a problem because the reverse roller 160 must simultaneously move the front end portion and the rear end portion of the printable medium P towards and away from the reversal tray 180. As a result, the rear end portion of the printable medium P cannot remain stuck between the reverse roller 160 and the discharge roller 152 when the front end portion of the printable medium P is being discharged towards the reversal tray 180.

In order to prevent the above problem, the reverse roller 160 should be separated from the discharge roller 152 at a certain point before the front end portion of the printable medium P arrives at the reverse roller 160 after the rear end portion of the printable medium P has moved along the moving path S2, to smoothly stack the printable medium P on the reversal tray 180.

A method of realizing the above-described operation will now be described with reference to FIGS. 5A, 5B and 5C. Referring to FIG. 5A, the printable medium P in the reversal tray 180, both sides of which have been scanned, is returned to the second moving path S2 using the reverse roller 160. A front end portion of the printable medium P is detected by the first sensor 191 after the front end portion of the printable medium P passes by the transport rollers 130.

Referring to FIG. 5B, when the first sensor 191 detects the front end portion of the printable medium P, the reverse roller 160 is separated from the discharge roller 152 by a motor or other component which moves the reverse roller 160 upwards away from the discharge roller 152. At this point, the printable medium P remains between the transport rollers 130, and thus, is smoothly transported by the transport rollers 130. Also, although the front end portion of the printable medium P overlaps with the rear end portion of the printable medium P at the position of the reverse roller 160, since the reverse roller 160 is separated from the discharge roller 152, the printable medium P is smoothly stacked on the reversal tray 180 without disruption by the reverse roller 160.

Referring to FIG. 5C, when the second sensor 192 detects the rear end portion of the printable medium P, the reverse roller 160 contacts the discharge roller 152 by being moved back downwards towards the discharge roller 152. Then, the reverse roller 160 rotates in the counter-clockwise direction. Thus, the printable medium P is stacked on the reversal tray 180.

At the time when the second sensor 192 detects the rear end portion of the printable medium P, the front end portion of the printable medium P has already passed the reverse roller 160, since a length L1 of the printable medium P is longer than the loop formed by the first moving path S1 and the second moving path S2. Therefore, although the reverse roller 160 contacts the discharge roller 152, the transportation of the printable medium P is not interrupted. Accordingly, the printable medium P is transported by the transport rollers 130, the reverse roller 160, and the discharge roller 152.

Afterwards, the printable medium P is stacked on the reversal tray 180 and is discharged to the discharge tray 170 through the operation described with reference to FIG. 4B. Thus, by sequentially performing the operations illustrated in FIGS. 4A, 5A, 5B, 5C, and 4B, both sides of each of the printable media P are scanned and the printable media P are stacked in the discharge tray 170 in the original order in which the printable media P were originally stacked in the feeder 110. According to an aspect of the present invention, if the printable medium P is to be stacked on the discharge tray 170 in the original stacking order, the reverse roller 160 selectively contacts an upper one of the discharge rollers 152 according to a length of the printable medium P in relation to a length of the loop. If the length of the printable medium P is longer than the length of the loop, the reverse roller 160 is controlled to contact the upper one of the discharge rollers 152 and reversely transfer the printable medium P from the reversal tray 180 to the second moving path S2 until the first sensor 191 detects a front end portion of the printable medium P, is then controlled to be separated from the upper one of the discharge rollers 152 until a second sensor 192 senses a rear end portion of the printable medium P, and is then controlled to re-contact the upper one of the discharge rollers 152 to transfer the printable medium P to the reversal tray 180, and if otherwise, the reverse roller 160 is controlled to constantly contact the upper one of the discharge rollers 152.

The operations described above with reference to FIGS. 5A, 5B and 5C can be selectively performed by the user. That is, if the user does not want the stacking order of the printable media P in the discharge tray 170 to be the same as the stacking order of the printable media P in the feeder 110, for example, because the user prefers a quicker scanning operation, the user may choose not to perform the above-described operation illustrated in FIGS. 5A, 5B, and 5C. However, if the user does want the stacking order of the printable media P in the discharge tray 170 to be the same as the stacking order of the printable media P in the feeder 110, and the length L1 of the printable medium P in the lengthwise direction is greater than the transportation distance L2 from the reverse roller 160 to the pair of discharge rollers 150 via the second moving path S2, the operations described with reference to FIGS. 5A, 5B and 5C should be performed to ensure a smooth transportation and discharge of the printable media P.

As described above, the image scanning apparatus and the method of scanning using the image scanning apparatus according to aspects of the present invention have the following advantages. First, the image scanning apparatus includes an additional reversal tray on which a printable medium P may be temporarily stacked after one side of the printable medium P has been scanned. Thus, aspects of the present invention prevent interference between discharged printable media P and a printable medium P that is currently being scanned, thereby preventing damage to the printable media P.

Second, the reverse roller 160 is driven by power transmitted from the discharge roller 150. Therefore, the reverse roller has a simple and efficient configuration.

Third, when a distance from the reverse roller 160 back to the reverse roller 160 via the second moving path S2 is shorter than the length L1 of the printable medium P in a lengthwise direction, the reverse roller 160 can be installed to be selectively separated from the discharge roller 152, thereby preventing damage or transportation interference of the printable medium due to contact between the printable medium P and the reverse roller 160.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, more than one reversal tray 180 may be attached to the main body 100 of the image forming apparatus, in which case additional discharge rollers 150, reverse rollers 160, moving paths S1 and S2, and path conversion units 190 may also be used. Accordingly, it is intended, therefore, that the present invention not be limited to the various example embodiments disclosed, but that the present invention includes all embodiments falling within the scope of the appended claims.

What is claimed is:

1. An image scanning apparatus comprising:
   a feeder on which printed media are stacked;
   a pick-up roller to pick up each printed medium from the feeder to be guided along a first moving path;
   a scanning unit to scan an image on the printed medium;
   discharge rollers to discharge the printed medium after the printed medium has been scanned via a discharge tray;
   transportation rollers to transport the printed medium between the pick-up roller and the scanning unit;
   a reversal tray located between the discharge tray and the feeder, on which the printed medium is temporarily stacked; and
   a reverse roller installed before the reversal tray at a junction between the reversal tray and an end of a second moving path, which is rotatable in both clockwise and anti-clockwise directions by power transmitted via one of the discharge rollers in order to guide the printed medium towards and away from the reversal tray along the second moving path,
   wherein the feeder, the pick-up roller, the scanning unit, the discharge tray, and the transport rollers are installed along the first moving path in order to scan images on one side of the printed medium, and the reversal tray and the reverse roller are installed along the second moving path in order to scan images from the other side of the printed medium, and
   wherein an upper one of the discharge rollers contacts the reverse roller to drive the reverse roller.

2. The image scanning apparatus of claim 1, wherein the reverse roller is installed to be able to contact the upper one of the discharge rollers which supplies the power to the reverse roller and to separate from the upper one of the discharge rollers.

3. The image scanning apparatus of claim 1, wherein the transport rollers are installed at a point where the first moving path joins with the second moving path.

4. The image scanning apparatus of claim 1, further comprising a path conversion unit installed in front of the discharge rollers along the first moving path to selectively guide the printed medium to the discharge tray or the reversal tray.

5. The image scanning apparatus of claim 1, further comprising a first sensor installed between the transport rollers and the scanning unit and a second sensor installed on the second moving path between the reverse roller and the transport rollers, wherein the first sensor and the second sensor detect a movement of the printed medium along the first moving path and the second moving path, respectively.

6. A method of scanning both sides of a printed medium using the image scanning apparatus of claim 1, comprising:
   stacking the printed medium on the reversal tray after the one side has been scanned;
   reversing a movement of the printed medium stacked on the reversal tray using the reverse roller; and
   scanning the other side of the printed medium.

7. The method of claim 6, wherein the stacking and the reversing comprise rotating the reverse roller by rotating the upper one discharge roller.

8. The method of claim 6, further comprising arranging the printed medium in a stacking order on the discharge tray which is the same as an original stacking order on the feeder by discharging the printed medium to the discharge tray after the printed medium, which has been scanned on both sides and stacked on the reversal tray in a reverse order to the original stacking order, is reversed by reverse-rotating the reverse roller after the scanning of the other side of the printed medium.

9. The method of claim 8, further comprising separating the reverse roller from the one discharge roller when a first sensor installed between the transport rollers and the scanning unit detects a front end portion of the printed medium on which the reversing of the movement is being performed when a distance from the reverse roller back to the reverse roller via the second moving path is equal to or shorter than a length of the printed medium in a lengthwise direction.

10. The method of claim 9, further comprising contacting the reverse roller with the one discharge roller when a second sensor installed on the second moving path detects a rear end portion of the printed medium on which the reversing of the movement is being performed.

11. An image scanning apparatus comprising:
   a feeder on which a printed medium is stacked;
   a pick-up roller to pick up the printed medium from the feeder and guide the printed medium into a main body of the image scanning apparatus;
   a scanning unit to scan an image on the printed medium;
   a reversal tray on which the printed medium is stacked;
   a path conversion unit to guide the printed medium to the reversal tray according to whether one or both sides of the printed medium are to be scanned;
   a discharge tray located below the feeder, wherein the reversal tray is located between the feeder and the discharge tray, and wherein the path conversion unit guides the printed medium towards the discharge tray when the one side of the printed medium is scanned, and guides the printed medium towards the reversal tray after the one side is scanned to scan the other side of the printed medium;
   a first moving path to guide the printed medium from the feeder past the scanning unit to the discharge tray to scan one of the sides;

a second moving path to guide the printed medium from the reversal tray back to the first moving path at a point before where the scanning unit scans the one side so that the other side faces the scanning unit to perform scanning of both of the sides;

discharge rollers to discharge the printed medium to the discharge tray; and a reverse roller to partially discharge the printed medium to the reversal tray and to reversely transfer the printed medium from the reversal tray to the second moving path, wherein an upper one of the discharge rollers contacts the reverse roller to drive the reverse roller.

12. The image scanning apparatus according to claim 11, further comprising:

transport rollers to transport the printed medium between the pick-up roller and the scanning unit;

a first sensor installed on the first moving path between the transport rollers and the scanning unit to detect whether a front end portion of the printed medium has passed the transport rollers; and a second sensor installed on the second moving path to sense whether a rear end portion of the printed medium is moving along the second moving path.

13. The image scanning apparatus according to claim 12, wherein the path conversion unit is controlled to guide the printed medium around a loop from the reverse roller back to the reverse roller along the first and the second moving paths twice or once according to whether the printed medium is to be stacked on the discharge tray in an original stacking order or a reverse stacking order.

14. An image forming method comprising:

feeding a printed medium into a main body of an image scanning apparatus;

scanning one side of an image on the printed medium as the printed medium moves past a scanning unit inside the main body;

guiding the printed medium to a reversal tray according to whether the one side or both sides of the printed medium are to be scanned, wherein the guiding of the printed medium comprises:

guiding the printed medium towards a discharge tray when only the one side of the printed medium is scanned, and guiding the printed medium towards the reversal tray when both of the sides of the printed medium are to be scanned;

rotating discharge rollers to discharge the printed medium along a first moving path to the discharge tray;

rotating a reverse roller to partially discharge the printed medium to the reversal tray and to reversely transfer the printed medium from the reversal tray to a second moving path to scan the other side of the printed medium; and rotating an upper one of the discharge rollers which contacts the reverse roller to drive the reverse roller.

* * * * *